US007424988B2

(12) United States Patent
McDonnell

(10) Patent No.: US 7,424,988 B2
(45) Date of Patent: Sep. 16, 2008

(54) USE OF AERODYNAMIC FORCES TO ASSIST IN THE CONTROL AND POSITIONING OF AIRCRAFT CONTROL SURFACES AND VARIABLE GEOMETRY SYSTEMS

(75) Inventor: William R. McDonnell, St. Louis, MO (US)

(73) Assignee: McDonnell Helicopter Company LLC, St. Louis, MO (US)

( * ) Notice: Subject to any disclaimer, the term of this patent is extended or adjusted under 35 U.S.C. 154(b) by 0 days.

(21) Appl. No.: 10/482,314

(22) PCT Filed: May 23, 2002

(86) PCT No.: PCT/US02/16453

§ 371 (c)(1),
(2), (4) Date: Dec. 30, 2003

(87) PCT Pub. No.: WO02/094655

PCT Pub. Date: Nov. 28, 2002

(65) Prior Publication Data
US 2004/0251383 A1 Dec. 16, 2004

Related U.S. Application Data

(60) Provisional application No. 60/349,677, filed on Jan. 17, 2002, provisional application No. 60/332,814, filed on Nov. 19, 2001, provisional application No. 60/293,144, filed on May 24, 2001.

(51) Int. Cl.
B64C 13/16 (2006.01)
(52) U.S. Cl. ........................................................ 244/82
(58) Field of Classification Search .................. 244/82, 244/17.11, 17.13, 17.25
See application file for complete search history.

(56) References Cited

U.S. PATENT DOCUMENTS 1,464,784 A 8/1923 Tarbox (Continued)

FOREIGN PATENT DOCUMENTS

FR 518435 5/1919

(Continued)

OTHER PUBLICATIONS

R.G. Loewy and S.P. Tseng, Smart Structures and Unstable Control Surfaces, AIAA, 3490-98 (1992).

(Continued)

Primary Examiner—Tien Dinh
(74) Attorney, Agent, or Firm—Polster, Lieder, Woodruff & Lucchesi, LC

(57) ABSTRACT

The current invention relates primarily to the control of rotary wing and fixed wing aircraft where a small electric actuator (7, 104) changes the pitch on a small aerodynamic surface (5, 66) and the resulting airloads on said small aerodynamic surface are used to change the pitch on a significantly larger aerodynamic surface (3, 60). In the preferred embodiment the resulting airloads on said larger aerodynamic surface is then used to change the pitch on a still larger aerodynamic surface (1, 62). As a result small electric actuators are capable of moving and controlling large aircraft control surfaces with an effective two step amplification of power utilizing the energy in the airstream. The current invention also discloses means to control and prevent undesirable motion of said aerodynamic surfaces.

12 Claims, 8 Drawing Sheets

U.S. PATENT DOCUMENTS

| | | | |
|---|---|---|---|
| 1,763,228 A | | 6/1930 | Fokker |
| 1,935,824 A | * | 11/1933 | Upson .......................... 244/82 |
| 2,623,717 A | * | 12/1952 | Price ........................... 244/82 |
| 2,658,701 A | * | 11/1953 | Robertson .................... 244/82 |
| 2,827,249 A | * | 3/1958 | Glaus .......................... 244/179 |
| 3,027,119 A | * | 3/1962 | Griswold, II ............... 244/76 J |
| 3,075,727 A | * | 1/1963 | Ellis et al. ................ 244/17.13 |
| 3,363,862 A | | 1/1968 | Walter et al. |
| 4,025,230 A | * | 5/1977 | Kastan ........................ 416/18 |
| 4,053,123 A | * | 10/1977 | Chadwick ................ 244/17.11 |
| 4,455,004 A | | 6/1984 | Whitaker |
| 5,255,871 A | * | 10/1993 | Ikeda ..................... 244/17.13 |
| 5,409,183 A | | 4/1995 | Gunsallus |
| 5,913,492 A | | 6/1999 | Durandeau et al. |
| 6,142,413 A | * | 11/2000 | Dequin et al. ............ 244/17.13 |

FOREIGN PATENT DOCUMENTS

| | | |
|---|---|---|
| GB | 145766 | 3/1919 |
| GB | 148236 | 7/1920 |

OTHER PUBLICATIONS

F.K. Straub, A Feasibility Study of Using Smart Materials For Rotor Control, *Smart Mater. Struct.*, 5: p. 6 (1996).

* cited by examiner

USE OF AERODYNAMIC FORCES TO ASSIST IN THE CONTROL AND POSITIONING OF AIRCRAFT CONTROL SURFACES AND VARIABLE GEOMETRY SYSTEMS

CROSS-REFERENCE TO RELATED APPLICATIONS

This national phase application under 35 U.S.C. § 371 of PCT application PCT/US02/16453 claims priority of Provisional Applications 60/293,144 filed May 24, 2001, 60/332,814 filed Nov. 19, 2001, and 60/349,677 filed Jan. 17, 2002.

TECHNICAL FIELD

The present invention relates to the methods and mechanisms used to control the rotor for a rotary wing aircraft and the control surfaces and variable geometry systems of conventional fixed wing aircraft or watercraft.

BACKGROUND ART

In the past helicopters built by Kaman Aerospace Corporation have used what is called a servo tab to help control the collective and cyclic pitch of main rotor blades. These servo tabs are essentially aerodynamic control surfaces mounted to the back of the rotor blades at about 70% rotor diameter that provide rotor blade pitch up and pitch down moments to control the blade pitch. The position of the servo tabs is driven by control rods or cables from a swash plate similar to other conventional helicopters.

Also in the past, electronic "swash plates" have been used to provide electrical control and power to achieve collective and cyclic main rotor blade control but generally only on very small rotors because of the power requirements. Perhaps the closest two disclosures to the current invention as it relates to helicopter rotors was disclosed in U.S. Pat. No. 5,409,183, incorporated herein by reference, and in a Friedrich K. Straub paper.

Also in the past, trim tabs have been used to reduce trim loads on aircraft control surfaces.

SUMMARY OF THE INVENTION

The present invention provides improvements in the method of controlling helicopter rotors, aircraft control surfaces and variable geometry systems. Small aerodynamic surfaces are rapidly positioned by electric actuators to provide the aerodynamic forces to move rotary wing and fixed wing aircraft surfaces instead of more complex and heavy hydraulic systems, swash plates and control rods. More specifically as it relates to rotary wing aircraft the present invention makes it possible to control large helicopter rotors using an electronic "swash plate" and small electric actuators more typical of the size and power found on large model helicopters. This makes it possible to design a helicopter without the weight, cost and complexity of a hydraulic system, mechanical swash plate and associated control rods.

The present invention uses aerodynamic forces on one surface to change the aerodynamic forces on another surface and in most cases this in turn changes the aerodynamic forces on a third surface.

The preferred embodiment of the present invention as it relates to rotary wing aircraft control achieves this by utilizing aerodynamic forces to drive a servo tab or equivalent device. The servo tab or equivalent device in turn then controls the pitch of the rotor. In effect this approach provides a two step amplification of rotor blade control power over and above the electric actuator whereas the current servo tab system provides only a one step power amplification. This allows very small electric actuators with small power demands to control very large rotors. Also since it would be very difficult structurally and aerodynamically to mount a large electric actuator or hydraulic actuator in the high centrifugal force field near the 70% rotor diameter this approach also makes it feasible to directly drive a servo tab or equivalent device and replace the mechanical swash plate and control linkages associated with current servo tab systems.

This same approach can be optionally used to change the aerodynamic configuration in order to generate more lift at low dynamic pressure or to again streamline the system at high dynamic pressure.

One embodiment of the current invention also has a servo tab design that is more aerodynamic and efficient.

An embodiment of the invention comprises a rotor system that includes a streamlined structure for supporting a servo tab or a portion of a servo tab, the servo tab or portion of the servo tab extending behind a trailing edge of a rotor blade of the rotor system, wherein cross-sectional cuts made through the structure perpendicular to the rotor plane and up to 10 degrees from perpendicular to the lengthwise axis of the rotor blade reveal only traditional streamlined cross-sections with smooth transitions from a leading edge to a trailing edge that tapers down gradually like a conventional airfoil, Although a helicopter's tail rotor does not need cyclic control, an embodiment of this same invention can be used to achieve tail rotor collective control so that a large all-electric helicopter without hydraulics, swash plates and control rods is possible.

A similar approach is used for fixed wing aircraft where a small aerodynamic surface is rapidly positioned by an electric actuator to provide the forces to move the aircraft's control surfaces or variable geometry systems such as leading or trailing edge flaps in place of heavier, more complex, less reliable and more expensive hydraulic systems.

BEST MODE FOR CARRYING OUT THE INVENTION

Rotary Wing Aircraft

Figure 1:
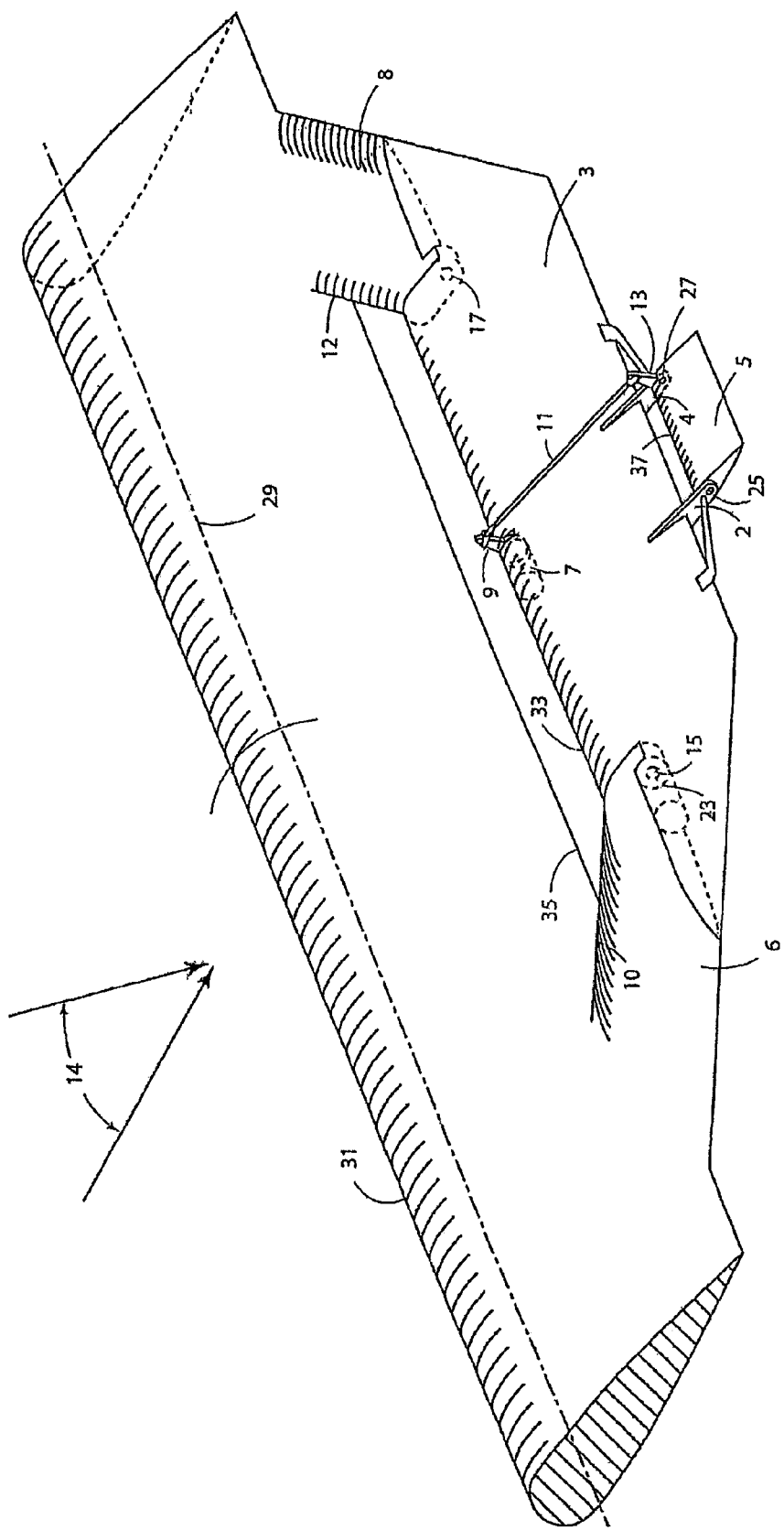
FIG. 1 is an isometric view of one embodiment of the invention for rotary wing aircraft showing essentially a servo tab on a servo tab for rotor blade control.

Referring now by reference numerals to the drawings and first to FIG. 1, one of the embodiments comprises a servo tab identified as sub-servo tab 5 mounted on the back of another servo tab 3 which in turn is mounted on the back of rotor blade 1. Tabs 5 and 3 are mounted so that they can rotate about their lengthwise pitch axis around hinges 25 and 27 and hinges 15 and 17 respectively. Sub-servo tab 5 is shown mounted to servo tab 3 in a manner typical of past servo tab designs using exposed support brackets 2 and 4 which create a lot of aerodynamic drag. Servo tab 3 is mounted to rotor blade 1 in an improved streamlined design with support brackets 6 and 8 that are designed with an airfoil cross-section and angled outward so that their rounded leading edges 10 and 12 are always facing into the range of angles of relative wind 14 which changes in forward flight based on the rotor blade rotational position around the rotor plane.

Current rotary wing aircraft control their flight by rotating each individual blade 1 about its lengthwise axis 29 near the quarter chord of the airfoil. On Kaman helicopters the rotor blade 1 is rotated leading edge 31 up by first rotating the leading edge 33 of servo tab 3 down. This causes servo tab 3 to generate a negative lift which pushes the trailing edge 35 of rotor blade 1 down and thus also raises the leading edge 31.

Figure 2:
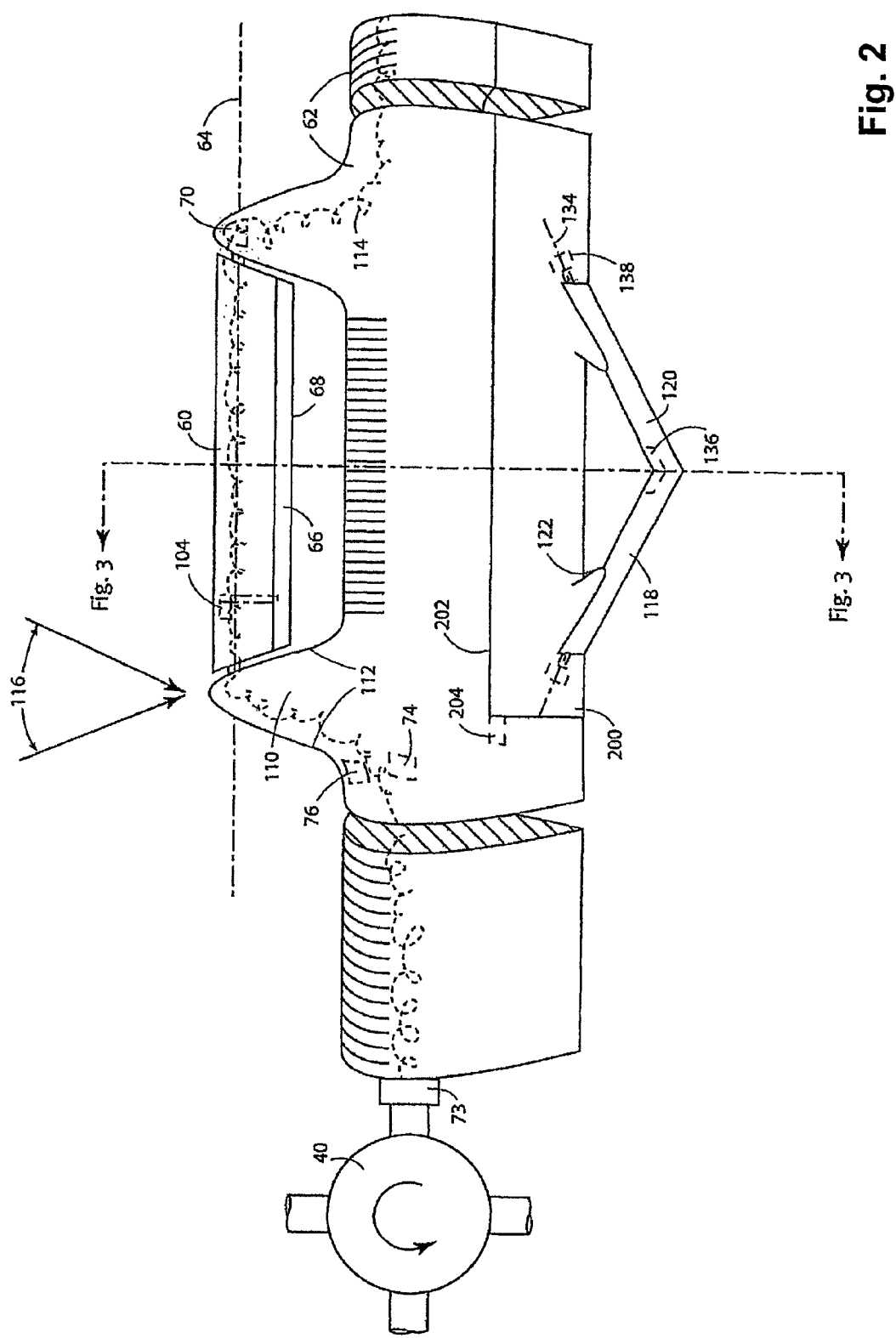
FIG. 2 is an isometric view of another embodiment of the invention for rotary wing aircraft with a servo tab mounted in front and another servo tab in back of the rotor blade. The servo tab mounted in front by itself is generally the preferred embodiment.

In Kaman helicopters the servo tab 3 is actuated by control rods or cables from a swash plate as is known in the art. In US Pat. No. 5,409,183 the servo tab is actuated by a hydraulic actuator mounted in the rotor blade. In the current invention, servo tab 3 is actuated by sub-servo tab 5. Most or all of the force required to rotate down the leading edge 33 of servo tab 3 is achieved by lifting the leading edge 37 of sub-servo tab 5 and thus increasing the lift of sub-servo tab 5. Sub-servo tab 5 can be controlled in a fairly conventional manner by electric actuator 7 through control arms 9 and 13 and control rod 11. Sub-servo tab 5 also could be driven in other ways such as with the use of piezoelectric actuators inside servo tab 3, and sub-servo tab 5 could instead be a flap or hinged portion of the trailing edge of servo tab 3 instead of mounted behind it, and servo tab 3 could instead be a flap or hinged portion of the trailing edge of rotor blade 1 as illustrated in FIG. 2. Whether shown in the drawings as a tab or a flap these surfaces will always be referred to as tabs for clarity when referring to surfaces involved in controlling the pitch on rotor blades or fixed wing aircraft control surfaces. Because actuator 7 only has to drive the very small sub-servo tab 5 instead of the much larger servo tab 3 a much smaller actuator can be used and faster deflections can be achieved.

Because flutter and other aerodynamic phenomena might be a challenge for precise positioning of servo tab 3 if it is mechanically unrestrained in pitch around hinges 15 and 17, a second electric actuator 23 can be used to directly control the rotational position of servo tab 3. This electric actuator 23 preferably uses a coreless motor for low inertia, and the output shaft is geared down. Because most or all the power to move the servo tab 3 comes from the aerodynamic forces on sub-servo tab 5, a very small actuator 23 can be used. Because of the geared down output shaft of the actuator 23 it however provides great stiffness to resist unwanted movement of the servo tab 3. Also a fixed or variable damping and/or braking device could replace actuator 23 as a way to avoid flutter and other undesired movement and improper positioning of servo tab 3.

Another alternative which is lighter still and generally preferred is to replace actuator 23 with a rotary potentiometer, optical encoder or other sensor such as a rate gyro on the servo tab 3 that is measuring the pitch position and/or movement of servo tab 3 and providing this feedback in a closed loop to a micro-processor near the servo tab for minimum processing and transmission delays. If undesired movement or improper positioning of servo tab 3 is detected by potentiometer 23 then the closed loop micro-processor system near the servo tab directs actuator 7 to move sub-servo tab 5 to generate damping forces that oppose the motion and forces the servo tab 3 back to its proper position. Although not shown, it is also understood that a potentiometer can also be located at the rotor hub to measure the individual blade 1 rotational position and provide this feedback also for a closed loop control system. Although not shown, a spring, twisted strap, or cam system can be used at hinge points 15 and/or 17 to create a nose up pitching moment for servo tab 3 so that sub-servo tab 5 can be producing lift during a greater portion of the flight envelope in essentially the same way that Kaman helicopters use twisted straps at the rotor hub to create nose up pitching moments for the rotor blades. Like Kaman helicopters the configuration in FIG. 1 would also benefit significantly from Kaman type twisted straps generating nose up rotor blade pitching moments at the rotor hub which reduces the necessary download and thus trim drag of servo tab 3.

There is currently a great deal of work studying different ways to reduce the vibrations of rotors by actively changing the lift on the rotor blades by changing the blade pitch more rapidly than once per rotor revolution which is called higher harmonic control. The current invention also applies to this application in that the proposed system can vary the rotor blade lift not only for cyclic and collective control but also in a higher harmonic mode to reduce rotor vibrations.

FIG. 2 shows generally the preferred embodiment of the current invention. For clarity only one of four blades is shown and foreshortened with the blade designed to rotate counter-clockwise about rotor hub 40, and servo tab 60 is mounted in front of the rotor blade 62. This is preferred since the servo tab 60 can generate lift throughout the majority of the flight regime to assist the rotor blade 62. Servo tab 60 has its own sub-servo tab 66 which in this case is built as part of the trailing edge of the airfoil of servo tab 60. The sub-servo tab could alternatively be located in front of servo tab 60 similar to the way that servo tab 60 is in front of rotor blade 62.

Sub-servo tab 66 is used to control the position of servo tab 60. Sub-servo tab 66 can be rotated about its lengthwise pitch axis similar to the elevator on a flying wing with conventional electric actuator 104 or other means such as piezoelectric actuators. The servo tab 60 is free to rotate about its lengthwise pitch axis 64 and preferably is stable with its aerodynamic center at or behind the axis of rotation 64 and its center of gravity in front of the aerodynamic center and at or in front of the pitch axis 64. As a result, servo tab 60 does not necessarily tend to de-stabilize the rotor blade 62 in pitch since the angle of attack of servo tab 60 does not increase as rotor blade 62 pitch increases which was the case in prior art U.S. Pat. No. 5,409,183. If the trailing edge 68 of sub-servo tab 66 is deflected up then the angle of attack of servo tab 60 increases which causes the lift of tab 60 to increase and in turn this increases the angle of attack of rotor blade 62. As a result, cyclic, collective and higher harmonic control of the rotor blade 62 and damping of servo tab 60 pitching movement can be achieved by small electric actuator 104 controlling the pitch position of sub-servo tab 66. In general, with the proper center of gravity and aerodynamic center, the mechanical friction and the aerodynamic dampening can prevent flutter in pitch of servo tab 60 about axis of rotation 64. If this is not sufficient for a particular design, a mechanical pitch dampener 70 can be added. Preferably instead of a mechanical pitch dampener, a potentiometer, optical encoder or similar device 70 can detect the position and pitch movement of servo tab 60 and provide feedback to a closed loop control system to provide pitch dampening through deflections of sub-servo tab 66 to counter the undesired motion. Also, the center of gravity of servo tab 60 is in front of its aerodynamic center and the hinge line 64 is generally located at the center of gravity or aerodynamic center or between the two for stability reasons. The natural frequency of oscillation of the servo tab 60 can be adjusted like the blades on a Kaman helicopter, for example by the stiffness of its pitch hinge attachment. The natural frequency of oscillation can also be varied in other ways such as by changing the ratio of servo tab 60 weight versus rotational inertia about the pitch axis, the center of gravity position relative to the pitch axis and changing the yaw angle of the pitch axis 64 so that the extension of the pitch axis 64 passes a different distance in front or in back of the center of the rotor hub 40. For example, one preferred configuration is to have the center of gravity in front of the pitch axis 64 and the pitch axis 64 canted in yaw so that the inboard extension of the pitch axis 64 would pass far enough behind the center of rotation of the rotor that the "tennis racquet" effect is essentially neutralized around operating angles of attack. This might make it possible for the servo tab 60 to weathervane better into gusts for a better natural gust elevation without the increased moment of inertia about the pitch axis 64 that would result from counter balance weights to eliminate the "tennis racquet" effect. Another approach is to have a cam and follower system on the inboard end of the shaft that the servo tab 60 rotates on inside the support structure 110. This cam system allows the shaft and servo tab 60 to move outboard for example as the shaft rotates up in order to neutralize the "tennis racquet effect" and provide a nose up pitching moment instead of using a twisted strap.

The servo tab 60 can also be biased nose up like the blades on a Kaman helicopter with a twisted strap so the sub-servo tab 66 can be generating positive lift more of the time. The servo tab 60 can also be biased nose up due to centrifugal forces and the "tennis racquet effect" with counter balance weights located in front of the pitch hinge and below the chord line of the servo tab 60 or behind the pitch hinge and above the chord line. If designed properly, placing the center of gravity of servo tab 60 far in front of the hinge line 64 can provide a higher level of gust alleviation since, when the blade 62 hits an updraft and starts to accelerate vertically, servo tab 60 will decrease in pitch which will tend to decrease the pitch of the rotor blade 62 and reduce its gust response. Because the servo tab 60 in most configurations can weathervane and thus is not as de-stabilizing for the rotor blade 62 in pitch, it is not as critical to have a closed loop control system that is constantly comparing the desired and actual rotor blade 62 pitch and driving the two together such as described in U.S. Pat. No. 5,409,183. However, if a closed loop system like that described in U.S. Pat. No. 5,409,183 is used, then the rotor blade 62 pitch can be obtained from a potentiometer or similar device 73 in the same manner as U.S. Pat. No. 5,409,183.

Referring again to FIG. 2 the servo tab mounting structure 110 is streamlined under all normal operating conditions of different angles of attack and different advance ratios and rotor plane rotational positions. This is due to the fact that the sides 112 of the servo tab mounting structure 110 are angled in yaw into the airflow so that for the full range of airflow yaw angles 116, each side 112 always sees incoming air and never sees a reverse flow condition where sides 112 essentially become trailing edges. As a result, these surfaces 112 can have large radius leading edges like the rest of the rotor blade 62 leading edge to handle the wide range of angle of attacks without flow separation. Cuts through said structure and said rotor blade perpendicular to the rotor plane and parallel to the local relative airflow experienced in translational flight reveal traditional streamline cross-sections with smooth transitions from a round leading edge to a trailing edge that tapers down gradually like a conventional airfoil.

Another advantage of this embodiment is that the servo tab mounting structure 110 provides substantial internal volume and a wide attachment at the rotor blade 62 leading edge for a light-weight structure that can more easily handle the loads.

Figure 3:
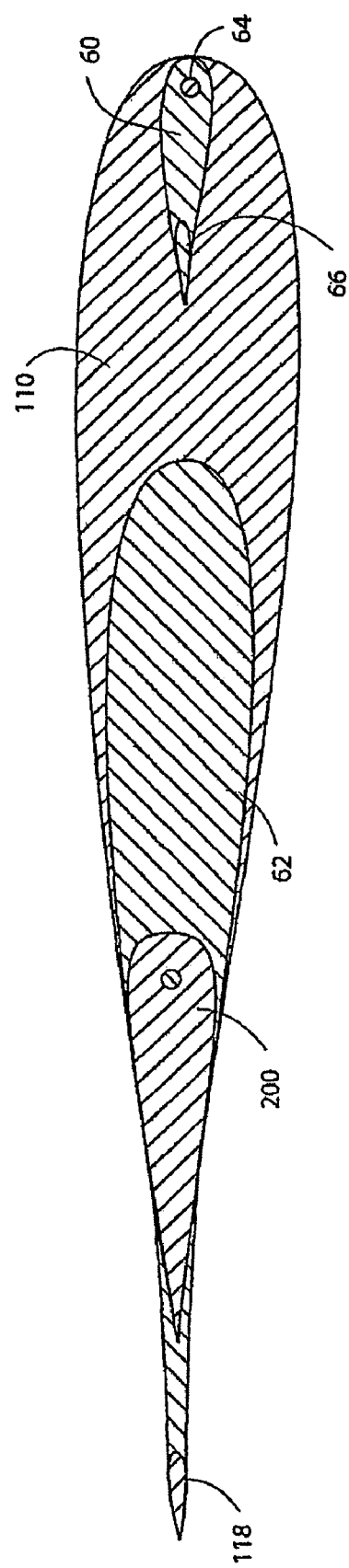
FIG. 3 is a cross-sectional cut through the configuration in FIG. 2

Another advantage of this embodiment is that the servo tab mounting structure 110 also tends to generate lift when the servo tab 60 is generating lift and helps minimize the induced drag because it provides a path in the structure for the vorticity 114 generated by servo tab 60 to stay in the structure and connect up with the vorticity in the rotor blade 62 and prevents a discontinuity and shedding of the vorticity into the air flow with the resulting loss of energy of a vortex on either side of the servo tab 60. FIG. 3 shows a cross-sectional view through the preferred embodiment of FIG. 2 and shows how the servo tab support structure 110 has enough vertical thickness to provide an end plate for the servo tab 60 in all normal operating pitch angles about hinge line 64. Although this is the preferred approach to support a servo tab in front of the rotor blade it can also be done with support members similar to that shown in FIG. 1 as angled support brackets 6 and 8, but extending forward instead of aft.

Figure 4:
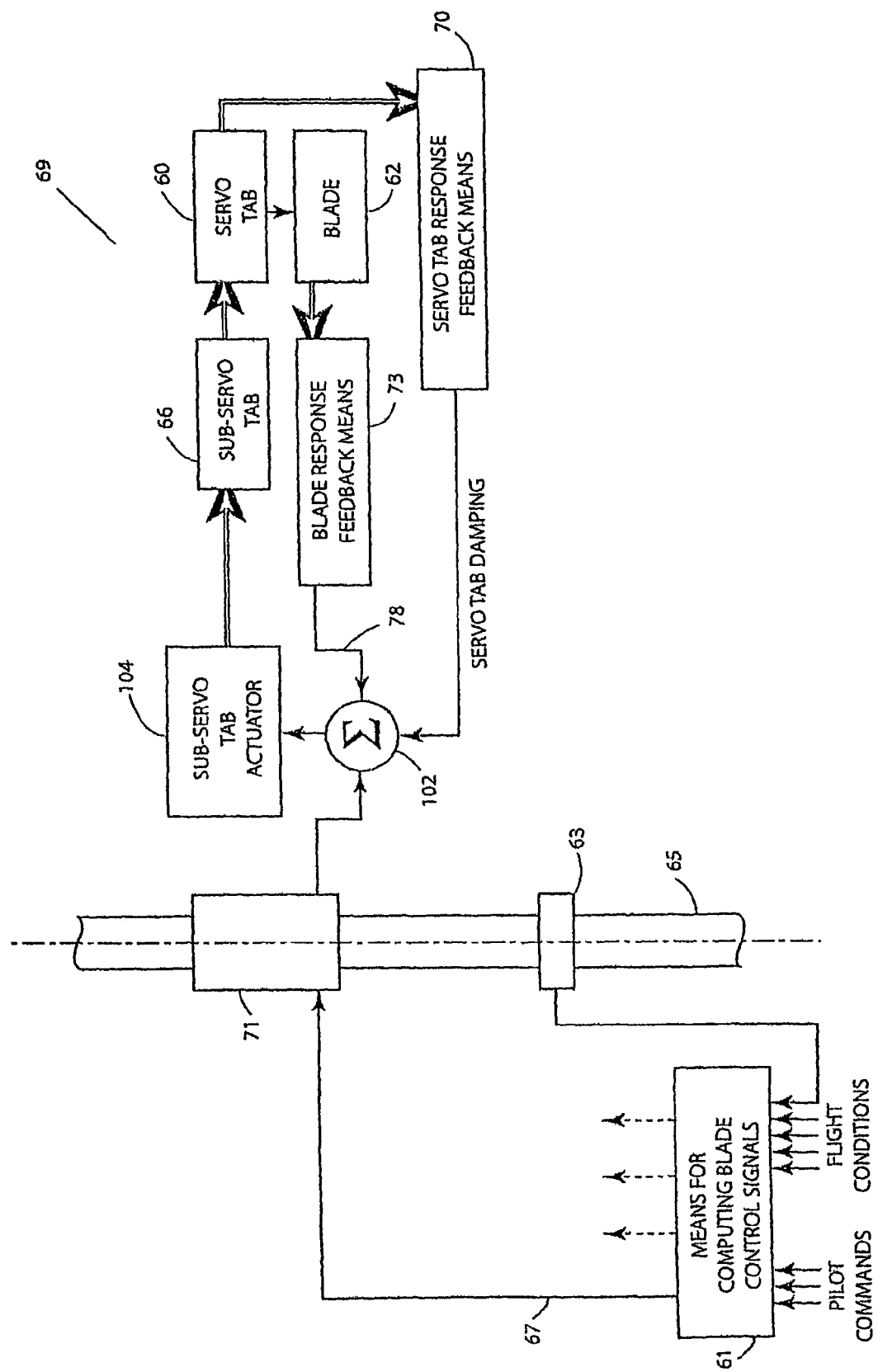
FIG. 4 is a schematic of one embodiment of the control system for the invention.

One of many potential control system designs is shown in FIG. 4. This control system differs from U.S. Pat. No. 5,409,183 in that there is no electric-to-hydraulic converter; the actuator 104 is electric instead of hydraulic and actuates the sub-servo tab 66 in order to move servo tab 60 instead of directly moving servo flap 60. Feedback from servo tab response feedback means 70 could also be used in an additional closed loop system to effect the control of sub-servo tab 66.

In FIG. 4 a flight control computer 61 computes the desired rotor blade pitch angles for all rotor blades as a function of time. For clarity only one of the control lines from this flight control computer 61 and one on-blade circuit 69 for one of the rotor blades is shown. Flight control computer 61 calculates the desired rotor blade pitch positions based on pilot commands and current flight conditions such as rotor rpm and shaft rotational position as measured by sensor 63 on rotor shaft 65 as well as parameters like altitude and airspeed. The control signal in line 67 from computer 61 passes from the helicopter fuselage to the rotating rotor system through a slip ring 71 where it is summed with the negative rotor blade position feedback signal 78 in summation device 102. If the desired and actual rotor blade pitch positions are different, then their sum is non-zero and this error message passes up to actuator 104 to correct the situation. Actuator 104 causes the rotor blade to change pitch by first changing the pitch of sub-servo-tab 66 which in turn changes the pitch of servo tab 60. The pitching movement of servo tab 60 is detected by servo tab response feedback means 70 which provides a feedback signal to summing device 102 so that actuator 104 moves sub-servo tab 66 to counter the servo tab 60 pitching movement to create an effective damping force to reduce the potential for flutter of servo tab 60. Damping of rotor blade 62 motion can be performed in a similar manner with sensor 73 providing signal 78 that includes both the negative of the blade pitch position and a signal for blade pitching motion to summing device 102 in order to cause actuator 104 to change the position of servo tab 60 through actuation of sub-servo tab 66 to counter this rotor blade 62 pitching motion as well as countering the improper positioning of the rotor blade 62.

A variation on this approach is to use rotor blade 62 lift or angle of attack as the control parameter that is detected by the blade response feedback means 72 for the primary closed loop control instead of rotor blade 62 pitch as detected by sensor 73. Actual rotor blade 62 lift could be extrapolated from local air pressure detected with a calibrated pressure transducer 74 detecting high air pressure from a tap on the lower surface of the rotor blade 62 as shown or with a pressure transducer detecting low air pressure from a tap on the upper surface. The actual angle of attack of the rotor blade 62 could be obtained with this lower surface pressure transducer 74 in combination with another pressure transducer 76 near the stagnation point at the tip of the airfoil to measure dynamic pressure. The higher the lower surface pressure measured by transducer 74 as a percentage of the stagnation pressure measured by transducer 76 the higher the rotor blade 62 angle of attack. Other methods to measure rotor blade 62 angle of attack are of course possible such as an angle of attack vane or effectively using servo tab 60 as an angle of attack vane by detecting its position relative to rotor blade 62 with potentiometer 70 and adjusting for sub-servo tab 66 position which will of course change the angle of attack of servo tab 60.

If the rotor blade 62 is stable and predictable enough in pitch then the blade response feedback control loop including feedback means 73 in FIG. 4 can be deleted and summing device 102 can be used to compare desired servo tab 60 positions coming from the flight control computer 61 with the actual servo tab 60 position coming from servo tab response feedback means 70. Higher harmonic control capability can be incorporated into the flight control computer 61 or it may be better to have sensors and micro-processors (not shown) actually in the blades and providing higher harmonic control adjustment signals (not shown) directly into the summing device 102.

Figure 5:
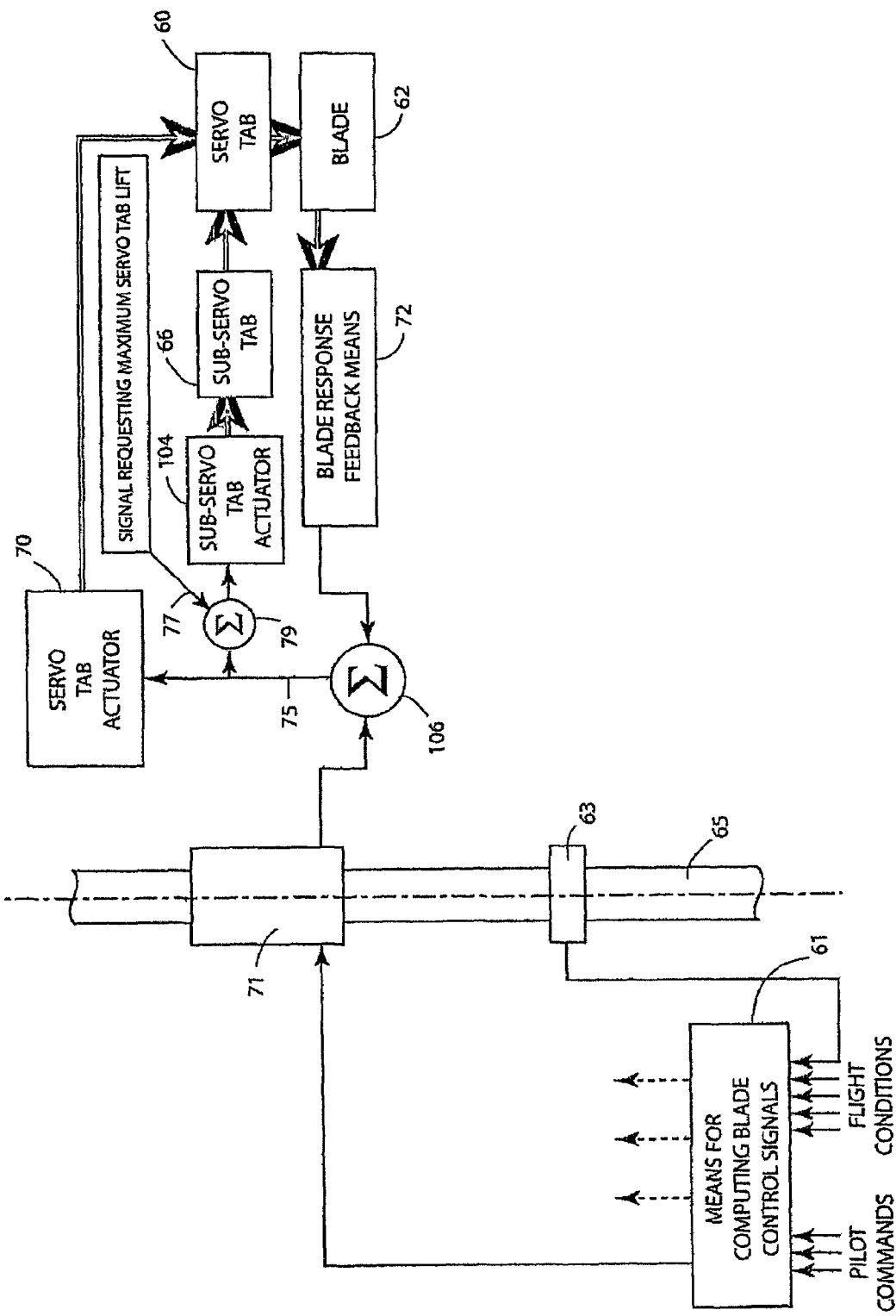
FIG. 5 is an alternate schematic of the control system for the invention.

FIG. 5 shows an alternate control system schematic which is applicable to the system shown in, FIG. 2 when the mechanism 70 is a second actuator instead of just a sensing device for preventing unwanted movement and improper positioning of servo tab 60 as previously described. In this case when the summing device 106 detects that rotor blade pitch is not where it should be, a signal 75 is transmitted to both servo tab actuator 70 and sub-servo tab actuator 104 to correct the situation. Actuator 104 moves the very small sub-servo tab very rapidly and the aerodynamic force thus produced provides the vast majority of the power to move the servo tab. One advantage of this parallel actuator approach is that once the servo tab 60 is rotated to its full trailing edge down position it can be held in this position while sub-servo tab 66 is then deflected to its full trailing edge down position also to act as a flap to increase the maximum lift generating capability of the combined aerodynamic surfaces. A micro-processor (not shown for clarity) could provide a signal 77 to summing device 79 to reverse the deflection of the sub-servo tab when these conditions are met and maximum lift is desired.

Again, if rotor blade 62 is stable and predictable enough then summing device 106 in FIG. 5 can be used to compare the desired servo tab 60 position calculated by the flight control computer, instead of blade pitch, with the actual servo tab 60 position, instead of actual blade pitch from response feedback means 72. If rotor blade 62 and servo tab 60 are both stable and predictable enough naturally or with use of mechanical dampeners, then no control loops may be necessary and the flight control computer 61 could provide the desired sub-servo tab positions directly to the sub-servo tab actuator 104.

Again referring to FIG. 2, in some cases it may make sense to have a trailing edge servo tab 200 used in combination with the preferred embodiment of the leading edge servo tab 60. Both of these control surfaces can be used together to increase the pitch of the entire rotor blade assembly 62 by generating more lift in front of the rotor blade 62 with the leading edge servo tab 60 and reducing lift behind the rotor blade 62 center of gravity with the trailing edge servo tab 200 and vice versa for decreasing the pitch. Or, if both leading 60 and trailing edge 200 devices are commanded to generate lift they can increase the lifting capability of the rotor while balancing out their pitching moment effects as required such as on the retreating side of the rotor in forward flight to avoid retreating blade stall. A servo tab 200 is part of the trailing edge of the rotor blade 62 airfoil and hinged along line 202. Sub-servo tabs 118 and 120 have an airfoil cross-section and are mounted to the trailing edge of servo tab 200 and angled so they achieve a larger moment arm to the hinge line 202 for increased control power. A V-shaped pin 136 can tie the servo tabs 118 and 120 together for structural efficiency but still allow them to rotate about their different pitch axes. The leading edge 122 of the support structure can have a large radius for a streamlined design because the yawed angle keeps this surface always a leading edge to the relative wind. Sub-servo tab 120 rotates about axis 134 and is controlled by rotary actuator 138. At the inboard end of servo tab 200 is a twisted retaining strap 204 that carries the centrifugal force of servo tab 200 and acts to make the tab 200 want to deflect trailing edge down proportional to the centrifugal force in the same manner as twisted retaining straps on Kaman helicopter rotor blades. The dynamic pressure drops on the retreating side of the rotor in high speed horizontal flight which causes the flap 200 to naturally want to deflect down under the force from the twisted strap 204 and thus increase the potential lift co-efficient on the retreating side. The dynamic pressure increases on the advancing side and tends to blow the flap 200 back up again into a streamlined position. This effect reduces the work load for trailing edge servo tabs such as 120 in actuating flap 200.

In all the approaches mentioned above, the lift generated by the sub-servo tab, servo tab and rotor blade are varied by changing the pitch angle of those surfaces. However this invention covers a wide range of variations, and there are many other ways to vary the lift generated by aerodynamic surfaces and many other ways to connect that aerodynamic surface to a servo tab in order to use that lift from that aerodynamic surface to move and control a servo tab. For example, sub-servo tab 5 in FIG. 1 need not be directly mounted to servo tab 3 in order to control the pitch of servo tab 3 but could be connected through a series of linkages or cables. Another example could include a small propeller-like device with sub-servo tab 5 taking the form of blades on this propeller whose pitch is adjustable so as to drive the shaft in one direction or the other like a windmill. This shaft in turn could drive a worm gear that changes the pitch of servo tab 3.

Although not preferred, the aerodynamic forces on one surface such as a sub-servo tab could provide the power to move other aerodynamic surfaces such as a spoiler on the servo tab or a variable drag device above or below the rotor blade to change rotor blade pitch and thus change the lift generated by the rotor blade. Also not preferred, but perhaps useful in the case of an extremely torsionally rigid rotor constrained from changes in pitch, a sub-servo tab could move a flap on the back of the blade to provide a direct lift change to the blade.

Figure 6:
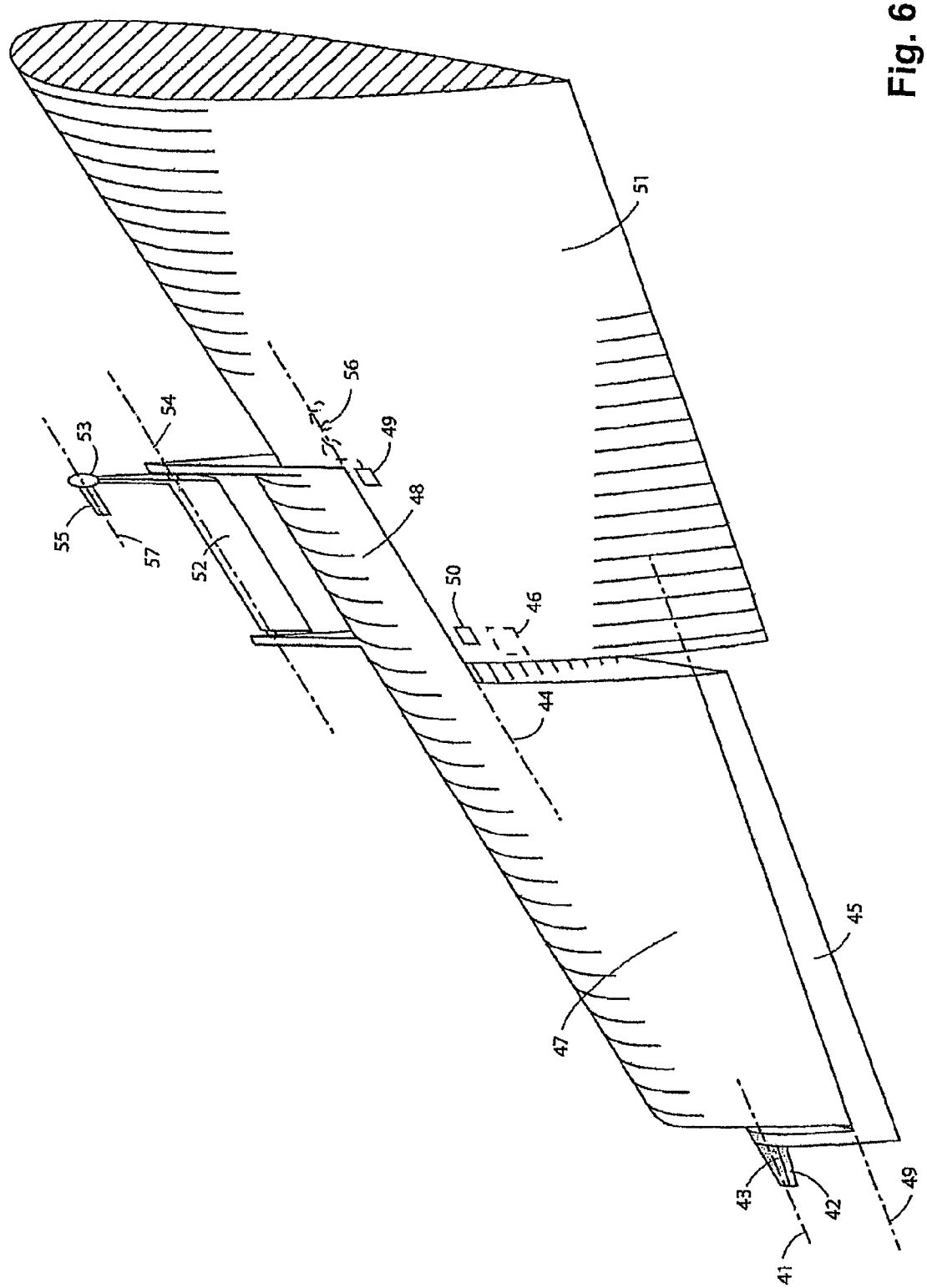
FIG. 6 is a view looking down and outboard on one embodiment of the current invention as it applies to the aileron on a fixed wing aircraft.

FIG. 6 shows one embodiment of the invention as it relates to the aileron 47 on the wingtip of a wing 51 of a fixed wing aircraft. This embodiment is almost identical to the way the system works for a rotary wing aircraft. An actuator (not shown) changes the pitch of sub-servo tab 43 about rotation axis 41 either directly or through sub-sub-servo tab 42. Changing air loads on sub-servo tab 43 would change the pitch of servo tab 45 about its pitch axis 49, which in turn would change the pitch of aileron 47 about its axis of rotation 44. This achieves a two- or three-step amplification of power to allow small electric actuators to replace large hydraulic units. Like the rotary wing example, this system also can reduce gust response and thus can reduce wing bending moments. As an example, an accelerometer 46 when it detects a rapid onset of vertical acceleration can cause a microprocessor nearby to direct sub-servo tab 43 to respond to rotate the aileron 47 nose down to counter the gust and thus reduce wing bending moments and make the ride smoother for the passengers as well. Even without this active gust alleviation system the aileron can be designed to be stable with its aerodynamic center on or behind the hinge line 44 and center of gravity on or in front so it will tend to weathervane into a gust and thus will naturally reduce the wing bending moments and provide a smoother ride for passengers. In addition, an upward moving wind gust will tend to increase the lift on sub-servo tab 43 if it is not free floating, which will tend to deflect servo tab 45 and cause aileron 47 to deflect nose down to counter the gust. At lower airspeeds for greater roll authority the aileron structure 47 could be restrained in pitch and aero surface 45 could become the aileron. In this case, aerodynamic surface 43 would want to be free floating with its own sub-servo tab 42 so that aerodynamic surface 43 would not pick up more lift in the presence of an updraft and aerodynamic surface 45 would tend to deflect trailing edge up to counter an upward wind gust. A variable or fixed spring 56 can be used to generate a nose up pitching moment for aileron 47 so that the aerodynamic center of the aileron 47 can be behind the hinge line 44 for stability, yet servo tab 45 does not need to be creating a down load. This can minimize or eliminate trim drag. Although the sub-servo tab 43 and servo tab 45 are shown behind the hinge line 44 of the aileron 47, like the rotary wing examples they also can be located in front as illustrated by sub-servo tab 55 which pitches about hinge line 57 and is mounted ahead of servo tab 52 which pitches about hinge axis 54. Sub-servo tab 55 is attached to actuator 53 on the end of a rod extending forward from servo tab 52. An additional weight at actuator 53 can accentuate the gust alleviation effect for the wing 51 by moving the center of gravity of servo tab 52 forward so when the aircraft hits an updraft, servo tab 52 rotates more leading edge down than it would otherwise, which causes aileron 47 to rotate more nose down than it would from just the natural weathervaning effect. Again a spring (not shown for clarity) can be used to create a nose up pitching moment for servo tab 52 about hinge line 54 to reduce or eliminate the lift required by sub-servo tab 55 to maintain trim. Again like the rotary wing example, providing a servo tab 52 in front of the aileron hinge line 44 and a servo tab 45 behind the hinge line 44 allows both servo tabs to generate lift without changing the pitch of the aileron 47.

This invention can also work for a more traditional aileron design; however, the system shown in FIG. 6 effects control loads at or in front of, instead of well behind, the elastic axis of the wing because the entire wing panel moves instead of the loads being biased back toward the trailing edge aileron. As a result, it does not experience the problem of adverse wing twist and resulting control reversal, as a conventional aileron can at moderate to high speeds which can make it ineffective for both roll control and gust alleviation. The current invention applied to a conventional aileron reduces the control reversal effect but not as much as the configuration shown in FIG. 6. Aileron 47 has an extension 48 that overlaps the main wing structure just in front of the main wing's front spar and is attached by bearings 49 and 50 to this front spar to provide an efficient lightweight design. Extension 48 could also attach to an intermediate spar closer to the wing's elastic axis.

Figure 7:
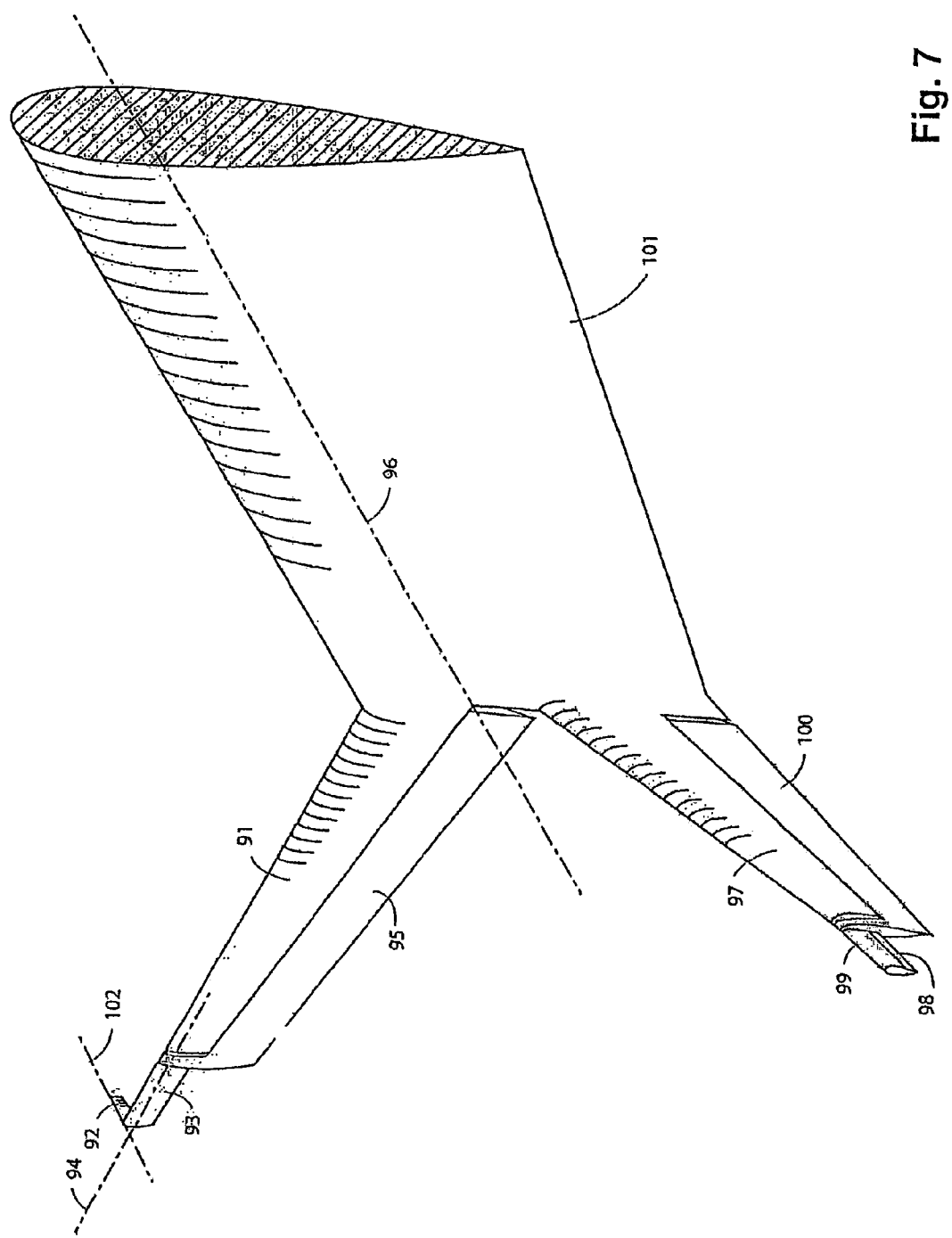
FIG. 7 is a view looking down and outboard of other embodiments of the current invention as it applies to the aileron on a fixed wing aircraft.

FIG. 7 shows two alternative approaches that can be used at a wingtip to provide roll control and gust alleviation without control reversal that could be used together or separately. One approach shown is a wingtip extension 91 with less sweep back angle, and in this case an actual sweep forward angle, so the air loads from the aileron 95 will act farther forward relative to the wing's elastic axis 96 to avoid control reversals. Forward mounted sub servo tab 92 rotates about axis 102 to control servo tab 93 about its free-floating hinge axis 94. The air load from servo tab 93 controls the pitch angle of aileron 95. When the aircraft encounters an updraft gust, even without an active gust alleviation system, aileron 95 tends to deflect up because of the increased air load on the aileron which acts to reduce the loads. This happens because the servo tab 93 is free floating and does not tend to pick up any more lift since it weathervanes into the gust. A winglet 97 is also shown with an aft-mounted sub-servo tab 98 on servo tab 99 controlling aileron/gust alleviation surface 100. Surface 100 on winglet 100 is less effective for roll control for the same size surface and produces a side force with roll input but can be effective for gust and wing load alleviation even in an aft mounted position on the wing 101 with less control reversal effect since the force vector of the surface 100 and winglet 97 is angled outward and over the elastic axis of the wing.

The systems shown in FIGS. 6 and 7 provide a good way to grow the lifting capability of a wing as an aircraft grows in gross weight without having to do as much redesign to strengthen the wing and thus can also save weight. If the active gust alleviation system fails or the aircraft is going through a particularly heavy storm, the control surfaces can be unloaded by rotating them nose down in order to further reduce wing bending moments.

Figure 8:
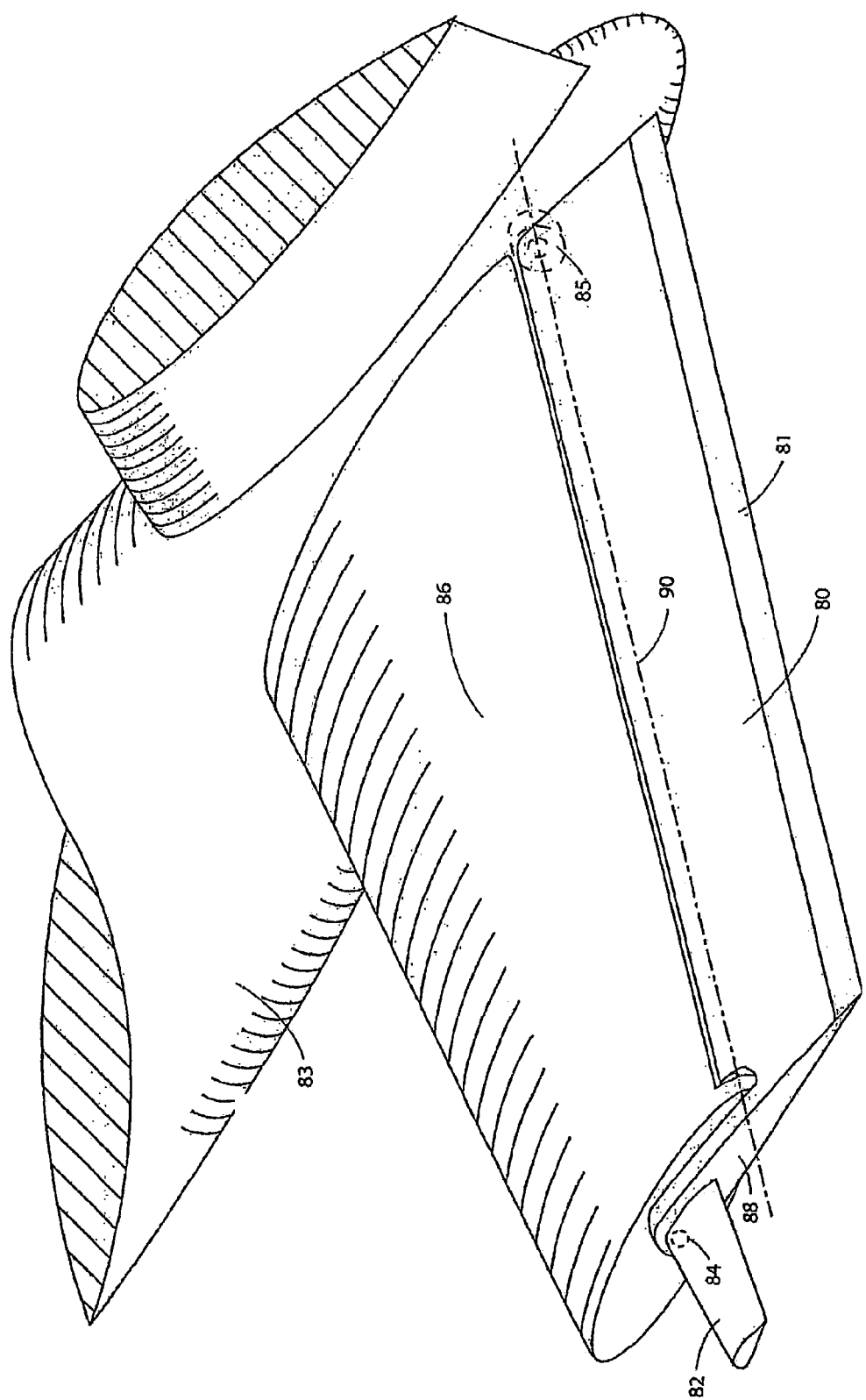
FIG. 8 is an isometric view of the current invention as it applies to the elevator on a fixed wing aircraft.

FIG. 8 shows an elevator 80 on a horizontal tail 86 of aircraft 83 but could also represent a rudder on a vertical tail. A forward mounted servo tab 82 is shown mounted at bearing 84 on the elevator 80 forward extending structure 88 and an aft mounted servo tab 81 is shown integrated into the trailing edge of the elevator 80. For clarity no sub-servo tabs are shown but of course could be incorporated. If, in addition to actuators to move the servo tabs 82 and 81, there is an actuator 85 that is directly moving the elevator 80, then when not required to be acting to help move the elevator 80, servo tab 81 could be used to effectively reshape the trailing edge camber along the full length of the elevator 80 for minimum drag or maximum maneuverability.

It should also be understood that there are many other ways that aerodynamic surfaces similar to 81 and 82 can be mounted and controlled about their pitch axis so that their resulting aerodynamic forces are used to move another control surface. It should also be understood that this system could be used as a backup system in case of loss of hydraulic power or multiple servo tabs like 81 could be mounted on a control surface like 80 or multiple sub-servo tabs could be mounted on a servo tab to provide redundancy for the system.

As in the rotary wing example it should be understood that actuator 85 could be replaced by fixed or variable dampers, braking devices or position sensors. Also the applicable control schematics are essentially the same as those in FIG. 4 or 5 except certain items such as the rotor rpm and position sensor 63 and slip ring 71 are not required for a fixed wing aircraft. Also for a fixed wing aircraft where just a servo tab is used without a sub-servo tab such as shown in FIG. 8, then the control schematic for elevator 80, servo tab 81 and actuator 85 can look like FIG. 5 except everywhere "blade" appears would be replaced with "elevator", the signal coming out of summing device 79 would go to servo tab actuator 70 that moves servo tab 81 that moves elevator 80, signal 75 would go to elevator actuator 85 that moves elevator 80 directly, and sub-servo tab 66 and its actuator 104 disappear.

Although all examples have shown hinged and separate moveable aerodynamic surfaces, it is possible to have smart structures where for example the trailing edge of an airfoil can be rotated trailing edge up without the trailing edge being truly a separate structure and without hinges. Although not shown, the same approach can be utilized on a canard wing or an entire wing that is hinged so it can rotate in pitch.

In all the preferred embodiments either the sub-servo tab is spaced away from the trailing edge of the servo tab and/or the servo tab is spaced away from the rotor blade or other aircraft control surface. This is done so that the sub-servo tab does not become relatively ineffective operating in the large boundary layer behind multiple much larger surfaces.

Aircraft were used for all the examples of this invention; however, this system could also have other applications such as to the control fins on submarines or ships.

The invention claimed is:

1. A rotor rotatable in one direction about a rotor axis, said rotor including a hub and a plurality of elongated blades connected with said hub, each of said blades extending generally radially outwardly from said hub and being movable relative to said hub about a pitch axis extending along its length, each of said blades having a leading edge and a trailing edge with respect to rotation of said rotor in said one direction, each said blade being equipped with a second aerodynamic surface rotatably attached to said blade about an axis generally oriented radially outwardly from said hub, said axis of said aerodynamic surface being located aft of the pitch axis of the blade, and a third aerodynamic surface attached to said second aerodynamic surface; a control system capable of controlling the lift generated by said rotor blades by directing an actuator that in turn varies the airloads on said third aerodynamic surface, the airloads from said third aerodynamic surface being used to generate moments to assist in rotating said second aerodynamic surface; and a mechanism for preventing undesired motion of said second aerodynamic surface or said rotor blade.

2. The rotor of claim 1 wherein said third aerodynamic surface is rotatably attached to a mounting structure and the rotational position of said third aerodynamic surface relative to said mounting structure is a function of the position of said actuation system independent of the position of said second aerodynamic surface.

3. The rotor of claim 2 in which a sensor detects the pitch position or movement of said second aerodynamic surface, said second aerodynamic surface pitch or movement data is provided to a computer to calculate the desired position of said actuator that is directly controlling the position of said third aerodynamic surface.

4. The rotor of claim 3 wherein a device imparts a nose up pitching moment to said second aerodynamic surface which increases as the centrifugal force experienced by said second aerodynamic surface increases.

5. The rotor of claim 2 in which a sensor detects the pitch position or movement of said rotor blade, said blade pitch or movement data is provided to a computer to calculate the desired position of said actuator that is directly controlling the position of said third aerodynamic surface.

6. The rotor of claim 2 wherein said actuator is mounted in said second aerodynamic surface and is capable of controlling the pitch position of said third aerodynamic surface.

7. The rotor of claim 1 wherein said mechanism controls the motion of said second aerodynamic surface and is selected from the group consisting of an actuation and a braking mechanism that can selectively facilitate movement or hold constant the relative angle in pitch of said second aerodynamic surface relative to its support structure.

8. The rotor of claim 1 wherein said mechanism controls the motion of said second aerodynamic surface and is a feedback control system that senses the position or movement of said second aerodynamic surface and directs said actuation system to change the air loads on said third aerodynamic surface to correct any undesired movement or positioning of said second aerodynamic surface.

9. The rotor of claim 1 wherein said mechanism controls the motion of said second aerodynamic surface and is a mechanical damper that provides forces which oppose the rotational movement of said second aerodynamic surface.

10. The rotor of claim 1 wherein said mechanism controls the motion of said rotor blade and is a closed loop feedback control system that senses the position or movement of said rotor blade and changes the air loads on said third aerodynamic surface to change the air loads on said second aerodynamic surface in order to correct any undesired movement or positioning of said rotor blade.

11. The rotor of claim 1 wherein said actuator is mounted in said second aerodynamic surface and is capable of controlling the pitch position of said third aerodynamic surface.

12. A rotor rotatable in one direction about a generally vertical rotor axis, said rotor including a hub and a plurality of elongated blades connected with said hub, each of said blades extending generally radially outwardly from said hub and being movable relative to said hub about a pitch axis extending along its length, each of said blades having a leading edge and a trailing edge with respect to rotation of said rotor in said one direction, each blade being equipped with a second aerodynamic surface rotatably attached to said blades about an axis generally oriented radially outwardly from said hub, a third aerodynamic surface being attached to said second aerodynamic surface, a control system being provided that is capable of varying the lift generated by said rotor blades by directing an actuation system that in turn varies the airloads on said third aerodynamic surface, the airloads from said third aerodynamic surface being used to generate moments to assist in rotating said second aerodynamic surface; the leading edge of said third aerodynamic surface being spaced away from the trailing edge of said second aerodynamic surface and/or the leading edge of said second aerodynamic surface being spaced behind the trailing edge of said rotor blade.

* * * * *